US008556621B2

(12) United States Patent
Sequeira

(10) Patent No.: US 8,556,621 B2
(45) Date of Patent: Oct. 15, 2013

(54) EXTRUSION BLOW MOLDING APPARATUS FOR PREPARING POLYESTER ARTICLES

(75) Inventor: Clarence Sequeira, New Milford, CT (US)

(73) Assignee: PepsiCo, Inc., Purchase, NY (US)

( * ) Notice: Subject to any disclaimer, the term of this patent is extended or adjusted under 35 U.S.C. 154(b) by 256 days.

(21) Appl. No.: 13/023,946

(22) Filed: Feb. 9, 2011

(65) Prior Publication Data
US 2012/0201921 A1    Aug. 9, 2012

(51) Int. Cl.
B29C 49/04    (2006.01)

(52) U.S. Cl.
USPC .............................. 425/532; 425/208; 366/88

(58) Field of Classification Search
USPC ......... 425/532, 557, 560, 207, 208; 366/76.3, 366/79, 88, 89
See application file for complete search history.

(56) References Cited

U.S. PATENT DOCUMENTS

| 4,357,291 | A | | 11/1982 | Miller et al. |
| 5,156,790 | A | * | 10/1992 | Cucchisi et al. ............ 264/176.1 |
| 5,244,373 | A | * | 9/1993 | Capelle et al. ................ 425/208 |
| 5,698,235 | A | | 12/1997 | Satoh et al. |
| 6,086,353 | A | * | 7/2000 | Klaus .............................. 425/145 |
| 6,586,558 | B2 | | 7/2003 | Schmidt et al. |
| 7,507,474 | B2 | | 3/2009 | Varlet et al. |
| 7,686,997 | B2 | | 3/2010 | Agarwal et al. |
| 7,686,998 | B2 | | 3/2010 | Chakravarti et al. |
| 7,691,304 | B2 | | 4/2010 | Agarwal et al. |
| 2001/0003874 | A1 | * | 6/2001 | Gillette et al. .................. 34/483 |
| 2002/0065171 | A1 | * | 5/2002 | Raber ............................ 477/175 |
| 2003/0075833 | A1 | * | 4/2003 | Thomson .................. 264/328.17 |
| 2003/0112698 | A1 | * | 6/2003 | Hauck et al. ..................... 366/85 |
| 2005/0041522 | A1 | * | 2/2005 | Leveque et al. ................. 366/88 |
| 2007/0173629 | A1 | | 7/2007 | Shiga et al. |
| 2007/0252312 | A1 | | 11/2007 | Lonsway |
| 2008/0093777 | A1 | | 4/2008 | Sequeira et al. |

(Continued)

FOREIGN PATENT DOCUMENTS

| GB | 2291831 A | 2/1996 |
| JP | 4-047918 A | 2/1992 |

(Continued)

OTHER PUBLICATIONS

International Search Report mailed Aug. 28, 2012 in application No. PCT/US2012/023274.

*Primary Examiner* — Joseph S Del Sole
*Assistant Examiner* — Nahida Sultana
(74) *Attorney, Agent, or Firm* — Banner & Witcoff, Ltd.

(57) ABSTRACT

An extrusion blowmolding apparatus has an extrusion die having an upstream portion for receiving the thermoplastic polyester material and a downstream portion having a die head through which molten thermoplastic polyester material is flowed to form a parison suitable for extrusion blowmolding. The extrusion die has extending therethrough a generally cylindrical barrel and an extrusion screw disposed within the barrel having spiral flights along its length. In some aspects, the flight depths are lengthened so to provide a good melt at a suitable throughput. By also selecting an appropriate extrusion temperature profile, it is possible to eliminate or minimize unmelts, which can contribute to processing difficulties as well as defects in the resulting article. In other aspects, a closed-loop drying system is provided for achieving very low moisture levels in the polyester material to improve processing.

6 Claims, 5 Drawing Sheets

(56) References Cited

U.S. PATENT DOCUMENTS

| | | |
|---|---|---|
| 2009/0102102 A1 | 4/2009 | Borchert et al. |
| 2009/0161476 A1* | 6/2009 | Narukawa et al. ........... 366/76.3 |
| 2009/0181202 A1 | 7/2009 | Pecorini et al. |
| 2009/0214707 A1* | 8/2009 | Dechao ........................ 426/48 |
| 2009/0264545 A1 | 10/2009 | Sequeira |
| 2010/0120947 A1 | 5/2010 | Kuhmann et al. |
| 2010/0203222 A1* | 8/2010 | Dechao ........................ 426/632 |
| 2011/0089602 A1* | 4/2011 | Nogata et al. .............. 264/210.6 |

FOREIGN PATENT DOCUMENTS

| | | | |
|---|---|---|---|
| JP | 2006-056169 A | | 3/2006 |
| JP | 2006056169 | * | 3/2006 |
| WO | 2009/032977 A1 | | 3/2009 |

* cited by examiner

EXTRUSION BLOW MOLDING APPARATUS FOR PREPARING POLYESTER ARTICLES

BACKGROUND

Polymer resins, such as polyethylene terephthalate (PET), are widely used in the packaging industry. PET is a linear, thermoplastic polyester resin. The myriad advantages of PET include toughness, clarity, good barrier properties, lightweight, design flexibility, chemical resistance and good shelf-life performance. Furthermore, PET is environmentally friendly since it can often be recycled. These characteristics of PET make it a popular material in the manufacturing of containers, for example, beverage bottles.

There are a variety of production methodologies to produce PET containers. For example, injection stretch blow molding (ISBM) is commonly used to make PET bottles. Of the various methodologies, one-piece PET containers having an integrated handle (handleware) are commonly formed using extrusion blow molding (EBM). The EBM process includes extruding a polymer resin in a softened state through an annular die to form a molten hollow tube or parison. The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

Polyesters are typically classified by inherent viscosity (I.V.) as a measure of molecular weight. To form beverage bottles, "bottle grade" PET having an I.V. of about 0.72-0.84 dl/g, is typically used. Bottle grade PET has linear polymer chains and by design has a melt viscosity that is low enough to enable a faster injection stretch blow molding step with the least resistance to flow. Bottle grade PET generally cannot be used in the production of larger handleware containers using EBM because of low melt strength. Melt strength is quantified by measuring melt viscosity at very low shear rates (approaching zero shear rate). Low melt strength hinders the ability to form a suitable parison. If a parison in the molten state has insufficient melt strength, during the EBM process, as the parison is drawn down by its own weight, the parison forms an hour-glass shape or may completely collapse, thereby resulting in the inability to produce a container. As melt strength increases, material distribution in the walls of the resultant container improves, and the process becomes more controllable and repeatable.

To make PET suitable for EBM, high molecular weight PET having an I.V. of 1.0 dl/g or greater as measured by solution viscosity, could be used. For PET resins I.V. is used as a measure of molecular weight. The average molecular weight of a resin reflects the average length of polymer chains present therein. In general, melt strength increases with chain length and, thereby, also increases with molecular weight. However, higher I.V. polymers generally require higher processing temperatures. Higher temperatures may cause the resin to thermally degrade, resulting in more yellowness in containers produced. Moreover, the process window for a high I.V. PET in an EBM process narrows, making it difficult to run a stable extrusion blow molding operation over an extended period. In addition, longer chain lengths are more susceptible to shear and thermal degradation. Higher I.V. resins also tend to be more expensive than bottle grade PET resin commonly used to produce containers, increasing manufacturing cost.

An alternate solution to achieving a desirable melt strength is to use branched PET copolymers. An example is the Eastar Copolyester EB062, manufactured and marketed by Eastman Chemical Company. EB062 is a lightly branched PET copolymer having an I.V. of 0.75 dl/g. Branching effectively increases the melt strength of the resin. The EB062 copolymer also suppresses crystallization, which enables containers to be produced with high clarity, while allowing the resin to be processed at lower temperatures. Lower processing temperatures result in higher melt viscosity which in turn serves to improve process stability in extrusion blow molding.

While these characteristics serve to produce a container having good aesthetics and consumer appeal, they present challenges in terms of PET recyclability. High levels of such copolymers suppress the rate and extent of crystallization to such a level that results in a slow crystallizing resin. Amorphous or such slow crystallizing resins, when added to the PET recycling stream, tend to cause sticking, agglomeration and bridging issues during the drying process. This characteristic is a major impediment to PET recycling and, as a result, makes such PET resins unsuitable for reuse in the PET recycling process. When bottle grade PET and amorphous and/or slow crystallizing PET are combined, the performance of the molten blend of resins may exhibit a reduced rate and extent of crystallization, insufficient melt temperature, and insufficient physical properties such as hardness, tensile and flexural properties. The severity of these undesirable effects typically bears a direct relationship to the percentage of amorphous or slow crystallizing PET content in such melt processed recycled PET. As a result, PET copolymers such as EB062 generally are not recyclable when the concentration in the PET recycle stream exceeds 5% by weight blended with ground-up PET bottle flake.

Modified polyester resins that are both suitable for extrusion processing and compatible with PET recycling streams are described in application Ser. No. 12/425,697, the disclosure of which is hereby incorporated by reference in its entirety. It would be desirable to develop improved extrusion blow molding methods for preparing polyester articles that are compatible with PET recycling streams.

SUMMARY

In one aspect, an extrusion blowmolding apparatus has an extrusion die having an upstream portion for receiving the thermoplastic polyester material and a downstream portion having a die head through which molten thermoplastic polyester material is flowed to form a parison suitable for extrusion blowmolding. The extrusion die has extending therethrough a generally cylindrical barrel having a length to diameter (L/D) ratio of from about 20:1 to about 40:1, and an extrusion screw disposed within the barrel, wherein the extrusion screw comprises a shaft and a spiral flight extending radially from the screw shaft along at least a portion of the length of the shaft. The flight has an outer edge in sliding contact with an inner surface of the barrel. The cylindrical barrel has a radius R and the shaft has a radius S which satisfy the following relationship:

about $0.10 \leq [(R-S)/R] \leq$ about 0.40 in the feed section and about $0.03 \leq [(R-S)/R] \leq$ about 0.20 in the metering section.

In some embodiments, the spiral flight of the extrusion screw has a feed portion, a primary portion, a secondary mixing or barrier portion, and a metering portion. The flight depth dimensions may be about 0.93 inches for the feed portion, about 0.99 inches for the primary portion, about 0.11 inches for the secondary portion, and about 0.47 inches for the metering section. Such extrusion screw geometries were found to provide superior results, particularly a good melt at a suitable throughput. By also selecting an appropriate extrusion temperature profile, it is possible to eliminate or minimize unmelts, which can contribute to processing difficulties as well as defects in the resulting article.

In another aspect, an extrusion blowmolding apparatus is provided for preparing articles from a thermoplastic polyester material. Virgin copolyester may be combined with regrind in a blender. The blend is fed to a crystallizer, and then dried in a closed-loop drying system. An alternate arrangement would be for the regrind to be crystallized and dried separately and then blended with virgin resin. Either way the two dried polyester components are then fed into an extruder and extruded into a parison to form articles on a shuttle or wheel extrusion blowmolding (EBM) system. The closed-loop drying system includes a desiccant bed and a heat source for passing heated air through a hopper containing the polyester material, e.g., virgin polyester or virgin/regrind blend. Moisture-laden air is passed through the desiccant bed whereupon moisture is absorbed by the desiccant, and the dried air is reheated and returned to the hopper in a closed loop.

DETAILED DESCRIPTION

Figure 1A:
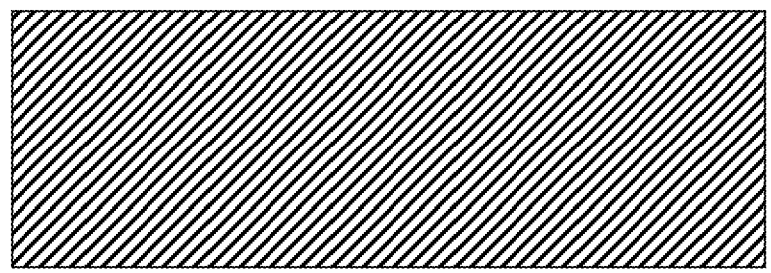
FIGS. 1A and 1B schematically illustrate polyester articles prepared by extrusion blowmolding.

Polyester compositions that may be used should have properties, such as melt strength, suitable for use in an extrusion blow molding (EBM) process. The composition should also be capable of developing sufficient crystallinity upon drying to reduce sticking and agglomeration, such that articles prepared from the composition are more conducive to recycling. Various types of containers can be formed using EBM process, e.g., beverage, food, or non-food containers of various sizes and shapes, including containers from a few ounces up to or greater than 5 gallons, as well as handleware type containers. For many types of articles, it is also desirable for the extruded material to exhibit good clarity.

Unless otherwise clear from the context, all percentages referred to herein are percentage by weight, based on the total dry weight of the composition.

The term "peak crystallization time," as used herein, refers to the maxima corresponding to the exotherm accompanying crystallization as determined using a DSC, when plotting normalized heat flow (W/g) versus time (min.), for an amorphous quenched polymer held isothermally at 170° C. under nitrogen.

The term "regrind," as used herein, refers to excess or scrap polymeric material that is recovered from the extrusion blow molding process and reintroduced into the extrusion process along with virgin materials. In an EBM process, for example, the source of regrind typically includes tails and moyles (material removed from below and above the article, respectively, as it is formed), scrap articles, and/or other unused or scrap polymeric material. The regrind may be dried and then combined with virgin materials, usually in an amount ranging from 0 to about 90 wt %, often from 0 to about 50 wt %, based on the total weight of the polyester composition.

Articles prepared from the polyester composition should be capable of developing sufficient crystallinity to prevent sticking during drying processes used in PET recycling. For example, the level of the crystallinity that can be developed should be sufficient to reduce sticking, agglomeration and/or bridging issues which can occur during the drying process in the recycling stream. Typically, the level of crystallinity that can developed should range from about 8 to about 40% and higher, usually is greater than about 10% or 12%, and often ranges from about 15 to about 30%. Crystallinity may be determined from effective density by using a density gradient column as described by ASTM 1505.

Suitable co-polyesters that may be used are commercially available, e.g., from Invista (Polyclear EBM PET 5505). Alternatively, modified polyester compositions may be prepared as described, e.g., in application Ser. No. 12/425,697. Chain extenders may be used to improve melt strength of the polyester composition to enable the composition to be used in EBM processes. Chain extenders are typically compounds that are at least di-functional with respect to reactive groups which can react with end groups or functional groups in the polyester to extend the length of the polymer chains. This advantageously increases the average molecular weight of the polyester to improve its melt strength. The degree of chain extension achieved depends on the structure and functionalities of the compounds used. Non-limiting examples of chain extenders include those described in U.S. Pat. No. 4,219,527, as well as trimellitic anhydride, pyromellitic dianhydride (PMDA), trimellitic acid, haloformyl derivatives thereof, or compounds containing multi-functional epoxy (e.g. glycidyl), or oxazoline functional groups. Nanocomposite material such as finely dispersed nanoclay may also be used for controlling viscosity. Commercial chain extenders such as CESA-Extend from Clariant, Joncryl from BASF, or Lotader from Arkema may also be used. The amount of chain extender can vary depending on the type and molecular weight of the polyester components. The amount of chain extender usually ranges from about 0.1 to about 5 wt %, often from about 0.1 to about 0.5 wt %.

Polyester compositions also may be modified with branching agents. Branching agents are compounds which have three or more functional groups, and can have low molecular weight. Non-limiting examples of branching agents include pentaerythritol and trimethylolpropane, or other suitable polyols. As with chain extenders, these functional groups can react with the hydroxyl or carboxyl groups in PET to extend chain length and/or create branching or cross-linking. The amount of branching agent can vary depending on the type and molecular weight of the polyester components. The amount of branching agent usually ranges from about 0.01 to about 1 wt %, often from about 0.01 to about 0.1 wt %. Also, initiating agents that form active radicals upon exposure to irradiation may also be added. The active radicals interact with functional groups in the polymer, leading to further chain extension and branching.

The polyester composition may optionally contain other various additives. The additives should not interfere with the intended properties of the composition and/or articles prepared therefrom. The amount of additive(s) may vary depending on the properties of the additive and the components present in the composition. For example, the amount of additive may range from 0 to about 1 wt %. Non-limiting examples of additives include UV absorbers, slip agents, plasticizers, nanocomposite material such as finely dispersed nanoclay for controlling viscosity, and pigments, which may be used to render an article opaque and/or create texture or other visual effects in an article.

The polyester may be melt processed or solid-stated. The rate of crystallization of the polyester may be optimized so that formed articles exhibit good properties, such as clarity, while also exhibiting good drying properties, recyclability, and the ability to use regrind. Usually, polyester as supplied has an isothermal peak crystallization time of less than 45 minutes. After compounding, the peak crystallization time typically is less than about 15 minutes, often less than about 10 minutes. Monomers used to form the co-polyester may be, for example, CHDM or IPA based, or other monomers used commercially in PET production. The level of such monomers may range, for example, from about 5 to about 50 mol %, and often ranges from about 5 to about 30 mol %.

Techniques such as melt compounding may be used to incorporate branching and chain extending ingredients, through a process of repeated expansion and contraction of the polymer blend with suitable characteristics. This type of mixing may be accomplished, for example, using Tek-Mix™ technology developed by Stratek Plastic LTD. and supplied by Xaloy as nXmix™. Alternately, extensional flow mixing may be used to augment branching and chain extension of polyester compositions with suitable crystallization characteristics that contains a lower level of branching to a higher more hyper-branched system by a second addition of branching and chain extending components. This approach may reduce the potential for gelation from non-uniform dispersion of reactive components, and may further increase branching between branch points of a branched polymer system.

Figure 1B:
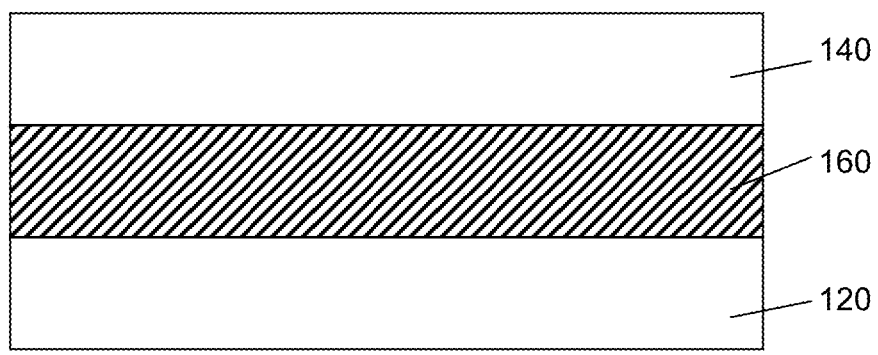

FIGS. 1A and 1B illustrate cross sections of articles made by extrusion blow molding. FIG. 1A illustrates a mono-layer polymer structure 100 made by extrusion blow molding a polyester material, such as IPA-modified PET copolyester. The melt strength of the polyester usually is at least about 1,500 Pa·s, often is at least about 2,000 Pa·s, and may range from about 10,000 Pa·s to 20,000 Pa·s, at temperatures ranging from 390 to 572° F. (199 to 300° C.). The thickness of the polymer structure may be about, for example, 0.25 to 1.27 mm (10-50 mils). Other thicknesses may also be useful, e.g., depending on the size of the container formed.

FIG. 1B illustrates a multi-layer polymer structure 102. The multi-layer polymer structure has a first layer 120, a second layer 140, and an intermediate layer 160 sandwiched between the first and second layers. The first and second layers can be formed from the same or from different materials. Suitable materials for the first and/or second layers can include, for example, polyester-based polymer or copolymers such as bottle grade PET, high I.V. PET, PETG, branched PET copolymer, or a combination thereof. Other materials having sufficient melt strength for extrusion blow molding can also be used. Any of the layers may also include regrind material. One of the first or second layers may serve as the inner container wall while the other serves as the outer container wall. The intermediate layer 160 may comprise, for example, an IPA-modified PET copolyester as described above with respect to FIG. 1A.

Figure 2:
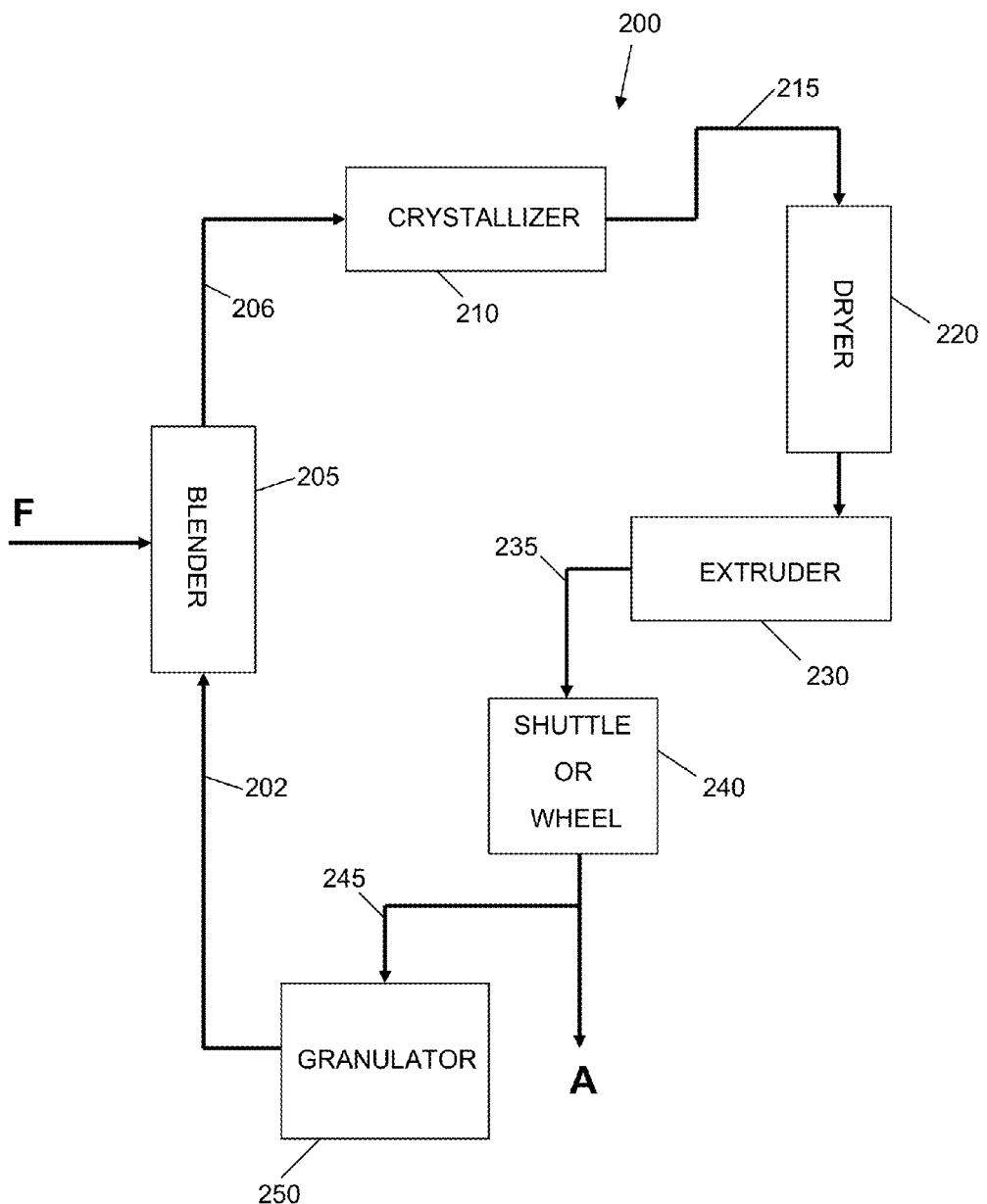
FIG. 2 shows an example of a typical process flow diagram for extrusion blowmolding.

With reference to the process schematically illustrated in FIG. 2, a feed F of virgin copolyester may be combined with regrind 202 using a suitable blender 205, such as a static mixer or a compounding extruder, such as a twin co-rotating screw extruder with an L/D ratio of at least 20:1. The compounding extruder typically has screw elements arranged with three kneading block sections. Examples of such devices include Werner & Pfleider ZSK series extruders made by Coperion Corporation. The screw arrangement may be designed for low to moderate dispersive mixing. The screw may have up to 10 barrel sections. For example, the polyester components may be introduced in barrel 1 and discharged from barrel 9. In such an arrangement, kneading blocks from feed to discharge are located in barrels 3, 5 & 7. Gravimetric or volumetric feeders can be used to control the respective quantities of pellets of the virgin and regrind components fed to the extruder.

Virgin polyester F may be provided in the form of flakes or pellets. Regrind 202 may be provided, for example, by collecting scrap material 245 from the extrusion blowmolding process and forming flakes or pellets in a granulator 250. Virgin polyester and regrind may be combined in any suitable proportion, e.g., at a virgin-to-regrind ratio ranging from about 1:20 to about 20:1 (w/w). Often, the virgin-to-regrind ratio ranges from about 1:10 to about 10:1, and usually ranges from about 1:3 to about 3:1. In one embodiment, virgin and regrind are used in a ratio of about 1:1 (w/w). The equipment illustrated in FIG. 2 may be configured for high throughput operations, e.g., 1000-1500 lbs/hr, although it should be recognized the invention is not limited to any particular throughput.

After the virgin polyester F is combined with regrind 202 in blender 205, the blend 206 is fed into a crystallizer 210. The crystallizer 210 may be configured to have an average residence time, e.g., of about 30 minutes to about 4 hours. During this time, the polyester should develop sufficient crystallinity to avoid bridging in the dryer 220. The level of crystallinity developed during the crystallizing/drying step should be at least about 8%, and often is at least about 15%.

Figure 2A:
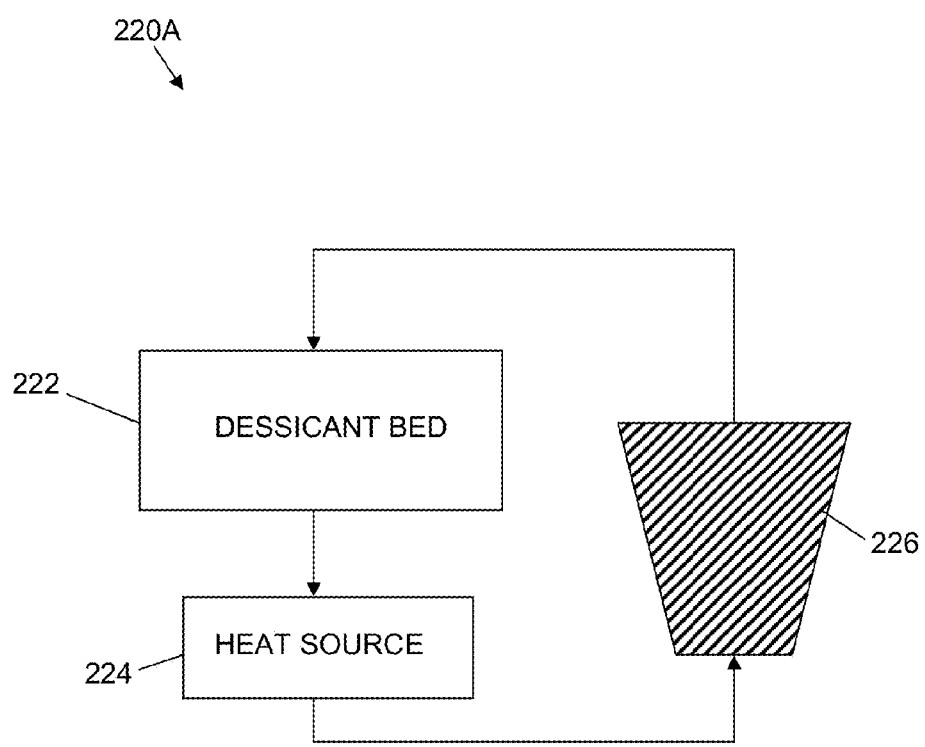
FIG. 2A is a schematic illustration of a closed-loop drying system for drying the thermoplastic polyester.

From the crystallizer the material is fed into a dryer 220. In one aspect as shown in FIG. 2A, the dryer comprises a closed-loop drying system 220A. The closed-loop drying system 220A includes a desiccant bed 222 and a heat source 224 for passing heated air through a hopper 226 containing the thermoplastic polyester material. Moisture-laden air is passed through the desiccant bed 222, whereupon moisture is absorbed by the desiccant, and the dried air is reheated via heat source 224 and returned to the hopper 226 in a closed loop. Drying temperatures may vary depending on such factors as the properties of the polyester, throughput, and the like. Often the drying temperature ranges from about 300-400° F.

In one embodiment, virgin polyester is dried in the closed loop drying system 220A for at least 6 hours at 350° F. using dry desiccant air at a wet bulb temperature (dew point) of −40° F. or lower. In another embodiment, a blend of virgin and regrind polyester (1:1 w/w) is dried for at least 8 hours at 350° F. using dry desiccant air at a wet bulb temperature (dew point) of −40° F. or lower. In both cases, the resulting moisture content is ≤30 ppm.

The dried polyester advantageously may be discharged from the dryer 220 without bridging (plugging the discharge port). The polyester composition then may be charged into the main extruder 230 to produce a parison as shown in step 235 for blow molding extrusion. Moisture, if present in the pellets, promotes hydrolytic degradation of the linear crystallizable PET chains during extrusion or blow molding, which may result in chain scission and an undesired drop in I.V. As an alternative to a closed loop desiccant drying system 220A as described above, other drying systems such as a vacuum drying also may be effective in reducing moisture in the resin. Moisture levels are usually less than about 100 ppm and often are less than about 50 ppm or 30 ppm.

The dried polyester material may be then fed into an extruder 230, the details of which are discussed more fully below. At step 235, the parison made from the extruded material is blow molded to form articles as shown as step 240. Regrind material from the process then is recovered in stream 245 and fed into a granulator 250 before being reintroduced into the blender 205 along with the virgin polyester feed F.

The extruder 230 is usually configured with a reverse temperature profile. A reverse profile provides a higher temperature at the feed zone so that as the crystalline resin is heated and melted along the length of the barrel, temperature is progressively reduced. Amorphous polymers are prone to bridging in the throat of the EBM extruder; as a result the zone settings should be carefully set so as not to cause the resin to heat up in the extruder throat and cause bridging. A partially crystalline material offers the advantage of allowing higher entry zone temperatures while greatly reducing the chance for bridging or plugging the extruder throat facilitating a more stable and reliable process. In most cases, the semi-crystalline polyester should enter the feed zone at a temperature below about 580° F. By way of example, temperatures for the feed, primary, secondary, and metering zones may be set at 550° F., 540° F., 530° F., and 500° F., respectively.

Figure 3:
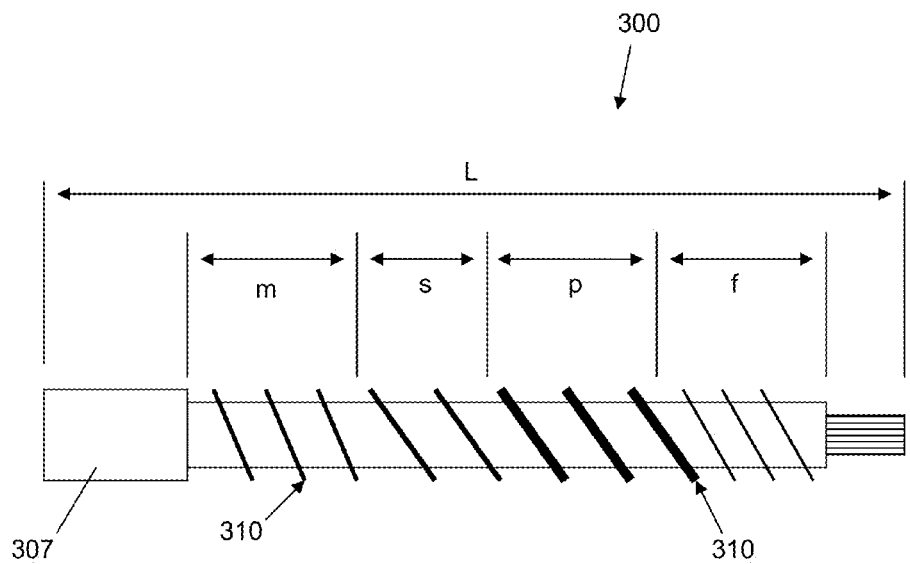
FIG. 3 schematically illustrates an extrusion screw.
Figure 4:
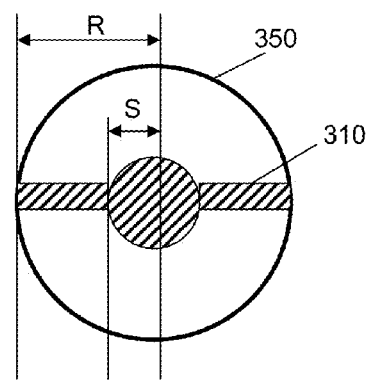
FIG. 4 is a cross-sectional view of the extrusion screw shown in FIG. 3.

In one aspect, as schematically shown in FIGS. 3 and 4, the extrusion screw 300 may have extruder screw flights 310 which are lengthened to provide a good melt at a suitable throughput. The longer flights 310 generally increase residence time and mixing energy in the extruder, and increase overall efficiency by increasing output per unit of energy input. The die pin and head also may be modified to reduce shear rate, resulting in lower melt temperatures. Using a monolayer head also was found to minimize excessive shear rate at higher throughputs.

The extruder 230 has an extrusion die which has extending therethrough a generally cylindrical barrel 350 having a length to diameter (L/D) ratio of from about 20:1 to about 40:1, and an extrusion screw 300 disposed within the barrel. The extrusion screw 300 has a shaft and a spiral flight 310 extending radially from the shaft along at least a portion of the length L of the shaft. The flight 310 has an outer edge in sliding contact with an inner surface of the barrel 350. In certain aspects of the invention, the length of the flight 310 is increased along one or more portions or zones of the extrusion screw 300, for example in the feed zone f and primary zone p. The length of the flight 310 may be represented by the proportional relationship between the extrusion screw shaft radius and the barrel radius. In one aspect, for example, the cylindrical barrel has a radius R and the shaft has a radius S which satisfy the following relationship in the feed section:

about $0.10 \leq [(R-S)/R] \leq$ about $0.40$.

In some cases the metering section, R and S satisfy the relationship:

about $0.03 \leq [(R-S)/R] \leq$ about $0.20$.

As shown in FIG. 3, the extrusion screw 300 often has a feed section f, a primary section p, a secondary section s, a metering section m. Additional mixing for consistency of the melt as it exits the extruder can be afforded by a static mixer or metering pump as shown by 307. In one embodiment, the depth of the flights 310 in these sections described by [(R−S)/R] is as follows: about 0.31 for the feed portion f, about 0.33 for the primary portion p, about 0.036 for the secondary portion d, and about 0.157 for the metering section. Such extrusion screw geometries were found to provide superior results for processing the polyester material, including a good melt at throughputs ranging from 1,000 to 3,000 lbs/hr.

The extruder 230 is typically one with a low compression ratio with a barrier section for mixing. For lower speed production (lower output) with longer residence times in the melt, a shorter screw, such as a 24:1 L/D may suffice. For higher speed production with shorter residence times, a longer screw, such as a 30:1 L/D may be used. For enhanced melt quality in high speed production, extruders may be fitted with melt pumps to supplement melt homogeneity. Upon entering the extruder, the pellets of the polyester composition are heated to above the melting point to soften the polymer, usually above about 220° C. The softened polymer is extruded through a die head to form a hollow tube. In the case of co-extrusion, multiple layers are extruded concurrently through a die head comprising a plurality of concentric, annular dies to form a multi-layer tube. Typically, the tube is extruded between two halves of an open mold. When the tube reaches the proper length, the mold closes, catching and holding the neck end of the tube open and pinching the bottom end closed. The parison is thus formed.

One important aspect of the process is the minimization of fines. Fines are generated in the grinding of regrind. The fines are susceptible to polymerize to higher molecular weights during processing. The higher molecular weight fraction requires a higher melt temperature than the bulk polymer. As a result, the fines are prone to remain unmelted during extrusion. This can lead to defects in the resulting articles, and also can cause interruptions in the operation of dryers and other resin transfer equipment. Fines generation can be minimized through such steps as proper selection of the grinder screen. Fines can be minimized post-grinding by suitable classification techniques such as elutriation. Resulting unmelts in finished articles can also can be minimized by selecting appropriate extruder zone temperatures as described above. Increasing the melt residence time by increasing the extruder L/D ratio and/or using a screw with deeper flights also allows the minimization of "unmelt" defects in the finished article.

The polyester composition optionally is modified at step 235 by irradiating the parison as it emerges from the extruder die head. Branching of the PET chains can be effected in-situ using electron beam (e-beam) initiating agents compounded into the melts and activating the initiators as the molten parison as it emerges from the extruder die head. This can be accomplished, for example, by exposing the molten parison with e-beam radiation as soon as the melt exits the die head. Irradiation results in the formation of active-radicals, which can react with functional groups in the polymer blend, resulting in branching and consequently higher melt strength.

At step 240, the parison is blow molded to form the container. Here, the parison, in a softened state, is placed in a hollow blow mold having a cavity corresponding to the desired shape of the bottle. Air or other compressed gas is injected to inflate the parison against the interior walls of the blow mold. Upon contact with the walls, the parison cools rapidly and assumes the shape of a container mold. By way of example, the polyester composition may have a melt temperature in the range of 230 to 260° C. and may be blown into a parison using less than 90 psi of blow air.

Figure 5:
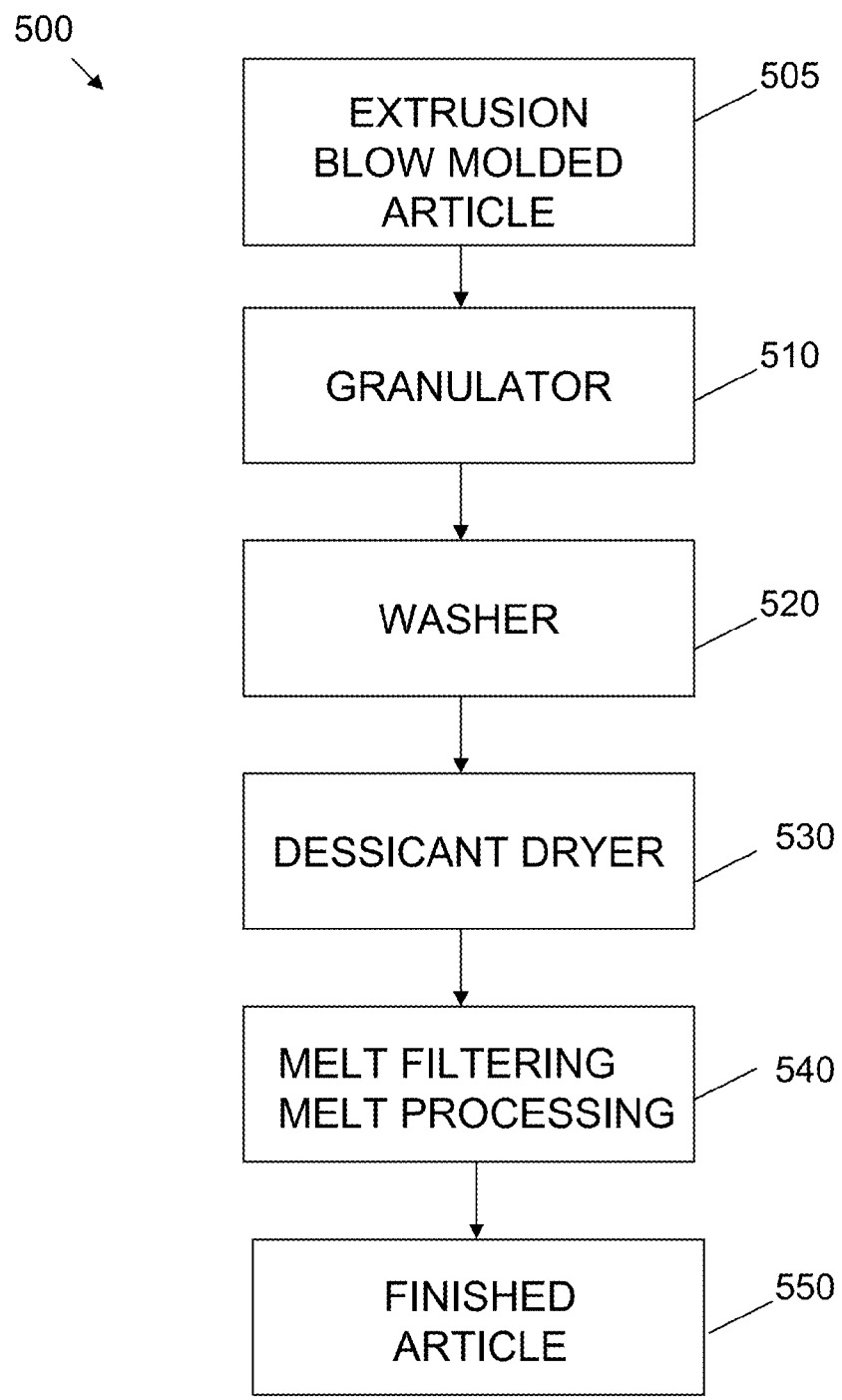
FIG. 5 is a process flow diagram illustrating PET recycling of extrusion blow molded articles.

In some aspects, articles formed by the extrusion blow-molding process are suitable for recycling in PET streams. FIG. 5 illustrates a typical process 500 for recycling of the extrusion blow molded articles. The articles 505 are collected and fed to a granulator 510, then to a washer 520, and then to a desiccant dryer 530. The material may be combined with other polymeric materials, such as virgin PET and/or PET from carbonated soft drink bottles. The material may then be melt filtered and melt processed in step 540 into finished articles 550. For example, the material may be processed by injection stretch blow molding (ISBM), strapping fibers, and other industrial applications.

The methods described herein are particularly useful in high-throughput extrusion blow molding machines 240, such as rotary wheels blow molding systems ("wheels extrusion systems"). Wheels systems are typically used with fractional to low-melt index HDPE & PP resins. Higher speed continuous extrusion blow molding possible with wheel machines favor higher melt viscosities because the parison formed from higher melt strength polymers allows for higher stretching rates that what is possible with EBM shuttle machines.

It was found the polyester compositions perform exceptionally well when the material making up the formed article has a solution I.V. of about 0.7 to about 1.3. The melt I.V. may be determined by using a parallel plate rheometer such as the Rheometrics RDA III. The melt I.V. of such polyester compositions also may range from about 0.8 to about 1.3.

Branched polyester compositions provide ease of processing, suitable die swell, ease of blow pin penetration of the parison to enable blowing of the container, and ease of subsequent trimming or deflashing. The shorter MW between branch points produces an extrudable PET material that is inherently more impact resistant. A system with more frequent branch points is able to retain "free volume" better with aging compared to one with fewer branch points or with a greater molecular weight between branch points. Free volume in polymeric systems is a state of disorder that is present upon rapid quenching of an article from a melt. The disorder of polymer chains in the polymer resulting in "free volume" has been shown to impede fracture in polymers. In amorphous polymer systems, free volume gradually decreases as polymer chains rearrange over extended periods of a few months or with exposure to higher temperatures to reduce the entropy of a system. A more frequently branched system avoiding gelation would arrest the reduction of free volume and thus enhance drop impact resistance. This can be demonstrated, for example, using free volume analysis in aging studies.

A hyper-branched system with lower MW between branch points also has desirable apparent shear viscosities, e.g., the apparent viscosity at 260° C. at 0.1 radians/sec may be greater than about 10,000 Pa·s. The system also may exhibit considerable shear thinning at higher shear rates with apparent shear viscosities of less than about 1000 Pa·s, often less than about 700 Pa·s. This results in a material with a higher zero shear viscosity for better melt strength as it exits the extrusion head, coupled with a lower viscosity at higher shear rates, thereby allowing the resin to be advanced (pumped) thought an extruder with less energy and lower heat generation. Lower heat generated in an extruder results in a polymer with less thermal degradation. The two characteristics exhibited both at the high and low end of the shear rate spectrum are highly desirable and advantageous.

The foregoing description should be considered illustrative rather than limiting. It should be recognized that various modifications can be made without departing from the spirit or scope of the invention as described and claimed herein.

What is claimed is:

1. An extrusion blowmolding apparatus for preparing articles from a thermoplastic polyester material, the apparatus comprising:
   an extrusion die having an upstream portion for receiving the thermoplastic polyester material and a downstream portion having a die head through which molten thermoplastic polyester material is flowed to form a parison suitable for extrusion blowmolding;
   wherein the extrusion die has extending therethrough a generally cylindrical barrel having a length to diameter (L/D) ratio of from about 20:1 to about 40:1, and an extrusion screw disposed within the barrel, wherein the extrusion screw comprises a shaft and a spiral flight extending radially from the screw shaft along at least a portion of the length of the shaft defining a feed section, a primary section, a secondary section, and a metering section, wherein the flight has an outer edge in sliding contact with an inner surface of the barrel; and wherein the cylindrical barrel has a radius R and the shaft has a radius S which satisfy the following relationship:

about $0.10 \leq [(R-S)/R] \leq$ about 0.40 throughout the feed section; and about $0.03 \leq [(R-S)/R] \leq$ about 0.20 throughout the metering section.

2. The extrusion blowmolding apparatus of claim 1, wherein the extrusion die is adapted to process the thermoplastic polyester material in an amount of at least about 1500 lb/hr. at a melt temperature of about 580° F. or less.

3. The extrusion blowmolding apparatus of claim 2, wherein the extruder has a feed zone, a primary zone, a secondary zone, and a metering zone.

4. The extrusion blowmolding apparatus of claim 3, wherein the temperatures of the extruder zones are as follows:
   feed zone: about 550° F.,
   primary zone: about 540° F.,
   secondary zone: about 530° F., and
   metering zone: about 500° F.

5. The extrusion blowmolding apparatus of claim 3, wherein the flight depth dimensions are about 0.93 inches for the feed zone, about 0.99 inches for the primary zone, about 0.11 inches for the secondary zone, and about 0.47 inches for the metering zone.

6. An extrusion blowmolding apparatus for preparing articles from a thermoplastic polyester material, the apparatus comprising:
   an extrusion die having an upstream portion for receiving the thermoplastic polyester material and a downstream portion having a die head through which molten thermoplastic polyester material is flowed to form a parison suitable for extrusion blowmolding;
   wherein the extrusion die has extending therethrough a generally cylindrical barrel having a length to diameter (L/D) ratio of from about 20:1 to about 40:1, and an extrusion screw disposed within the barrel, wherein the extrusion screw comprises a shaft and a spiral flight extending radially from the screw shaft along at least a portion of the length of the shaft, wherein the flight has an outer edge in sliding contact with an inner surface of the barrel; wherein the extruder has a feed zone, a primary zone, a secondary zone, and a metering zone; and wherein the flight depth dimensions are about 0.93 inches for the feed zone, about 0.99 inches for the primary zone, about 0.11 inches for the secondary zone, and about 0.47 inches for the metering zone.

* * * * *